United States Patent Office 2,960,522
Patented Nov. 15, 1960

---

2,960,522

DICRESYL MONOCHLOROMETHANE-PHOSPHONATE

Arthur Dock Fon Toy, Park Forest, and Kenneth H. Rattenbury, Chicago Heights, Ill., assignors to Victor Chemical Works, a corporation of Illinois No Drawing. Filed Oct. 7, 1954, Ser. No. 461,046

1 Claim. (Cl. 260—461)

This invention relates to a new compound, dicresyl monochloromethanephosphonate and a motor fuel containing the same. This compound has been found to be a valuable gasoline additive and also to possess desirable qualities for a hydraulic fluid.

This new compound may be made by the known process of reacting approximately stoichiometric quantities of cresol with monochloromethane phosphonic dichloride according to the following equation:

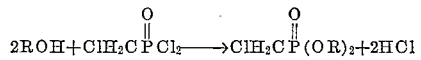

in which ROH is cresol, $CH_3C_6H_4OH$. Alkali metal cresolates may be substituted for the cresol in the above equation without altering the results. In some cases it is desirable to conduct the reaction in the presence of a tertiary amine to act as a hydrogen chloride acceptor.

The chloromethanephosphonic dichloride shown in the above equation may be made by the known process of reacting phosphorus trichloride and formaldehyde under suitable conditions of temperature and pressure. The distilled product resulting from this reaction is the preferred material. The cresol, or in some cases the alkali metal cresolate, may be the normal products of commerce. In the case of cresol the ordinary commercial product is a mixture of the ortho-, meta- and para-isomers and may even include small quantities of phenol or xylenols.

The following example illustrates the process by which this new compound may be made:

Example 237.6 grams of cresol (2 moles plus 10% excess) were placed in a 500 cc. flask equipped with a thermometer, capillary agitator and reflux condenser. To this was added 167.5 grams of monochloromethane phosphonic dichloride (1 mole). Heating was begun and after 20 minutes HCl began to evolve at 95° C. The reaction continued for 16 hours and 40 minutes to a final temperature of 210° C. 330.2 grams of product resulted which, after two distillations resulted in 238.9 grams (77% yield) of colorless liquid boiling between 160° and 165° C. at a pressure of ½ mm. of mercury. This product analyzed as follows:

|    | Theor., Percent | Found, Percent |
|----|-----------------|----------------|
| P  | 10.0            | 10.0           |
| Cl | 11.4            | 11.4           |

$n_D^{25}=1.5505$.  $d_{25}^{25}=1.2317$ gm./cc.

This compound has been found to be an excellent gasoline additive in that it reduces surface ignition or "ping" and aids in the prevention of the deposits which normally cause this trouble. It is well known that certain phosphorus compounds have this quality but this new compound has the additional advantage that it does not appreciably destroy the tetraethyl lead which is also normally present in gasoline. Thus the addition of approximately .62 grams (about 2.2%) of dicresyl chloromethanephosphonate to a gallon of gasoline containing 3.0 ml. tetraethyl lead (TEL) showed no destruction of the effectiveness of the TEL either in laboratory tests or in actual motor tests.

This new compound was also found to possess many of the qualities of an excellent hydraulic fluid. It was found to have a low pour point, high autogenous ignition temperature, good stability against decomposition, and excellent low temperature characteristics. In this respect, dicresyl chloromethanephosphonate was found to have viscosities at 105° F. and 212° F. of 36.4 and 5.3 centipoises respectively. From these data a viscosity index of 16.2 was calculated according to ASTM Standard QD151, Am S3, 1953–5, p. 88.

The foregoing detailed description has been given for clearness of understanding only and no unnecessary limitations should be understood therefrom as modifications will be obvious to those skilled in the art.

We claim:

Dicresyl monochloromethanephosphonate.

References Cited in the file of this patent

UNITED STATES PATENTS

| 2,599,761 | Harman et al. | June 10, 1952 |
| 2,682,522 | Coover et al. | June 29, 1954 |
| 2,900,405 | McCall et al. | Aug. 18, 1959 |